United States Patent [19]

Millon

[11] Patent Number: 5,135,785
[45] Date of Patent: Aug. 4, 1992

[54] POUCH CONTAINERS AND FILMS THEREFOR

[75] Inventor: Joel Millon, Boulogne Billancourt, France

[73] Assignee: Colgate-Palmolive Company, Piscataway, N.J.

[21] Appl. No.: 566,574

[22] Filed: Aug. 13, 1990

[51] Int. Cl.⁵ .................. B65D 30/02; B65D 33/38
[52] U.S. Cl. .................. 428/35.2; 428/35.4; 428/345; 428/349; 428/520; 428/216; 222/92; 222/107
[58] Field of Search .......... 428/35.2, 35.4, 35.5, 428/345, 520, 349, 522; 222/92, 94, 107; 156/90, 272.2, 196

[56] References Cited

U.S. PATENT DOCUMENTS

| | | |
|---|---|---|
| 4,828,891 | 5/1989 | Lustig . |
| 4,952,451 | 8/1990 | Mueller .................. 428/522 |
| 4,963,427 | 10/1990 | Botto .................... 428/349 |
| 4,977,022 | 12/1990 | Mueller .................. 428/349 |
| 4,998,646 | 3/1991 | Sherman ................. 222/107 |

*Primary Examiner*—Ellis P. Robinson
*Assistant Examiner*—Rena L. Dye
*Attorney, Agent, or Firm*—Michael J. McGreal; Robert C. Sullivan

[57] ABSTRACT

A pouch container can be produced for household products such as bleaches using a multi-layer film and RF sealing techniques. The film has at least one barrier layer and at least one seal layer. The film also has an oxygen permeability of at least about 600 cm³/m²/day/bar and a transmissivity for fragrances. In addition, the film should be of an age after manufacture of about 2 weeks to about 24 weeks. The pouches that are formed have strong seals and overall strength.

10 Claims, 1 Drawing Sheet

POUCH CONTAINERS AND FILMS THEREFOR

FIELD OF THE INVENTION

This invention relates to multi-layer films suitable for making pouches that can be sealed using radio frequency energy, and in particular to pouches that contain liquids or pastes and which have at least a partial transmissivity of oxygen and aromatic substances.

BACKGROUND OF THE INVENTION

There is a continuing effort to decrease the weight mass of material used in packaging. As a part of this effort, substances that have been sold in bottles are now being sold in film pouch containers. This reduces the packaging weight to less than half of that of a bottle. There can be an additional savings if the liquid substance is concentrated prior to film packaging. In this way, the amount of film packaging required can be further reduced since the diluent is added at the time of use. However, a film must have specific properties in order to be effectively used for packaging. This is particularly the case when the film package is to be formed and/or sealed using radio frequency (RF) energy techniques. In RF sealing techniques, RF energy is used to soften the film sufficiently so that the film can be welded. This is an effective sealing technique since the two layers of film that are to form the pouch are heated to similar temperatures and can be welded. At the point of sufficient softening, but prior to any flowing of the film material, the two layers become welded. This provides for significant advantages over techniques that use adhesives or the heating of the film by conduction, i.e., through contact with a heated plate. It is also the case that RF energy provides for a more uniform heating and thus produces good seals.

Although RF energy provides for good seals, there are certain requirements with regard to the use of RF energy. The film must be capable of being heated using RF energy. That is, it must be able to be heated to near melt through contact with RF energy having a frequency of about 10 MHz (Megahertz) to 50 MHz. This is the frequency range most used for heating polymeric materials. Not all polymeric films can be effectively heated to produce good seals using RF energy. The plastic film used in the sealing layer must be bysular for RF sensitivity.

The films will also require other characteristics dependent at least in part on the substance that is contained in the pouch made from the film. It has been found that when a film is to contain a bleach that the film must have a transmissivity for oxygen since oxygen is evolved during the storage of bleach pouches. If this oxygen cannot be dissipated through the pouch wall, pressure will build-up in the pouches to the point that the pouches could possibly rupture. If this occurs, there would be a loss of product and possible damage to the surrounding area. In addition, it is desirable with many substances to have some of the aroma of the substance contained in the pouch be transmitted to the exterior. This provides a way to acquaint the customer with the fragrance of the product. Consequently, it is desirable for the film to have a partial transmissivity for fragrances.

BRIEF SUMMARY OF THE INVENTION

Particular multi-layer films can be effectively used in the making of pouches using RF energy. The multi-layer film should contain at least one barrier layer and at least one seal layer. The barrier layer provides the primary containment layer and is the primary strength layer. The seal layer will readily absorb RF energy, soften and be weldable in the softened state. In a particular embodiment the seal layer is weldable to itself. The outer layer should also be printable. In addition to conveying information, the print will function as a slip agent during pouch formation from the film. Further, in order to form pouches having high strength seals using RF energy, the film must be used to form pouches within about 2 weeks to 24 weeks, and preferably within about 4 weeks to 20 weeks after film manufacture.

The preferred film consists of at least one barrier layer of a polyolefin and at least one seal layer of ethylene-vinyl acetate. The ethylene-vinyl acetate layers should preferably have an average vinyl acetate content of at least about 18 percent by weight and most preferably at least about 20 percent by weight. Thus, one ethylene-vinyl acetate layer can have a vinyl acetate content of less than 18 or 20 percent by weight as long as the other layer has a sufficiently high enough vinyl acetate content so that the average of both layers is at least about 18 percent by weight and preferably 20 percent by weight. The film has a thickness of about 125 microns to 500 microns, and preferably about 200 microns to 300 microns. The barrier layer has a thickness of about 25 microns to 100 microns, and preferably about 40 microns to 75 microns. The seal layer has a thickness of about 50 microns to 200 microns and preferably about 75 microns to 150 microns.

In addition to the foregoing, the film should have an oxygen transmissivity of at least about 600 $cm^3/m^2/day/bar$ and preferably at least about 1000 $cm^3/m^2/day/bar$. The transmissivity for fragrances should be about 1 to 25 weight percent of the fragrance content during a 90 day period and preferably about 3 to 15 weight percent of the fragrance content during a 90 day period. In this way, oxygen produced in the partial degradation of a substance such as bleach can be removed from the pouch and the fragrance of the produce can be sensed by persons at the time of purchase.

BRIEF DESCRIPTION OF THE DRAWING

The FIGURE is a rear elevation of a pouch container having a spout.

DETAILED DESCRIPTION OF THE INVENTION

Figure 1:
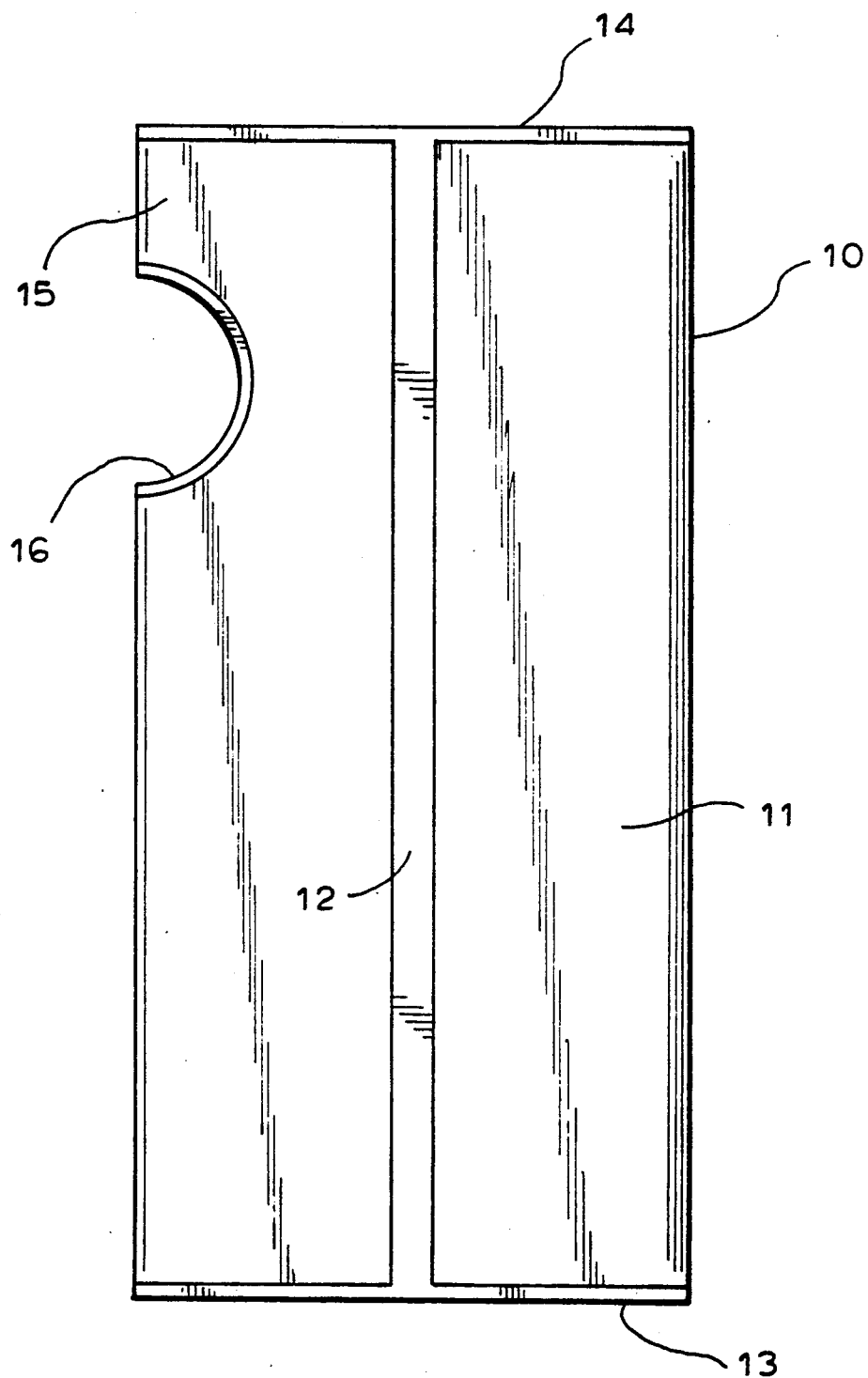

Polymer films are effective in many packaging uses. These polymer films can either be a single layer or multi-layer films. In many instances, a multi-layer film will have to be used since the film will have to have particular characteristics. Sometimes, the characteristics are dictated by the package design and the substance being packaged. There must be a compatability. The primary contained substance usually should not permeate through the polymer film. Strong seals should be formable. These are just some of the characteristics. In addition, when a bleach is being packaged, the film should have an oxygen transmissivity. It is also desirable in many instances if some of the fragrance of the product can permeate through the film. This permits the consumer to determine whether the fragrance of a product is acceptable It has been found that household products such as bleaches and fabric softeners, can be packaged in film pouches that are comprised of at least one barrier layer and of at least one seal layer. The barrier layer is preferably a polyolefin such as polyethylene or polypropylene. The polyethylene can be a high or low density polyethylene. The seal layer is preferably ethylene-vinyl acetate, and most preferably ethylene-vinyl acetate wherein the average vinyl acetate content is at least about 18 percent by weight and preferably at least about 20 percent by weight. Also, in a preferred construction, the film has three layers. These comprise a polyethylene layer with an ethylene-vinylacetate layer on each side. The polyethylene layer serves as a barrier layer and provides strength to the film.

The film has a thickness of about 125 to 500 microns, and preferably about 200 to 300 microns. The barrier polyethylene layer has a thickness of about 25 microns to 100 microns, and preferably about 40 microns to 75 microns. The seal ethylene-vinylacetate layers have a thickness of about 50 microns to 200 microns, and preferably about 75 microns to 150 microns. The ethylene-vinylacetate layers need not have the same thickness. However, in many instances, the same thickness will be used.

The film should have an oxygen permeability of at least about 600 cm$^3$/m$^2$/day/bar and preferably at least about 1000 cm$^3$/m$^2$/day/bar. This is particularly important in the packaging of bleach containing products which evolve oxygen which must be removed as it is evolved in order to prevent the rupture of the package. It is also a factor that the film have a transmissivity for fragrances. It is desirable that the fragrance of the household product be detected outside of the package. In this regard, the film should be able to transmit about 1 to 25 weight percent of the fragrance, and preferably about 3 to 15 weight percent of the fragrance during a 90 day period. However, since the fragrance is in the product to enhance the product during its use, the majority of the fragrance should remain in the product and not be transmitted through the film.

In addition, in order to effect good RF sealing the film should be within an age since manufacture of about 2 to 24 weeks, and preferably about 4 to 20 weeks. This is an age that will result in maximum RF sealing of the film. It has been found that films have a period after manufacture wherein maximum strength RF seals can be produced. In this regard, pouches and other containers should be formed during this period.

The time window when the film can be sealed most readily will depend to a large degree on the amount of slip agent that has been added to the film. The amount of slip agent in the present films will range from about 500 to 3,000 parts per million (ppm) of film resin. The slip agent is usually a wax, and preferably an amide wax. The roll tension on the film (tension of the film on the spool) will also affect the migration of the slip agent to the exterior of the film. It is the migration of the slip agent to the exterior surfaces of the film that results in poor RF sealing. When a film is wound at higher tensions on a spool there is less migration of the slip agent to the surface of the film. It stays to a large degree locked in the film. However, it becomes free to migrate when the film is unwound for various operations, such as printing and slitting.

A film will have a time window of usage in RF sealing depending primarily on the slip agent content of the film and the time at the initial winding tension ($T^1$) and the time after unwinding for conducting one or more operations such as printing and sliting ($T_2$). Due to the stability of the film at the initial winding tension $T^1$ will be fairly long. The time at $T^2$ will be less than that at $T^1$ since there is a greater migration of slip agent from the film during $T^2$. The time window for use ($T^1 + T^2$) will be about 2 to 24 weeks with $T^2$ being at least about 2 weeks to about 6 weeks. The time window for any particular film can be determined only by testing of the film over a period of time.

The RF sealing is usually conducted at frequency levels of about 10 megahertz (MHz) to 50 MHz and preferably 13.56 MHz, 27.12 MHz or 40.68 MHz. Of these three frequencies, 27.12 MHz is preferred. Sufficient energy is used to quickly soften the ethylene-vinyl acetate layers so that these layers can be quickly welded to form a seal.

The film package can be preformed and then filled or can be formed and filled in a continuous operation. These latter techniques are known as form/fill techniques.

Bleach is an aqueous solution of sodium hypochlorite. It is sold in dilutions of about 5 to 12 percent by weight sodium hypochlorite. The remainder is primarily water but may include additives such as preservatives, surfactants and perfumes. The film pouches in which the bleach is packaged ranges from 100 cc. to 500 cc. packages. A useful size is 250 cc. It is also preferred that the film packages have a spout on the upper end, the spout being in the form of a beak. Such a spout makes it easier for the consumer to safely use the bleach or other household product that is the subject of the packaging. A suitable package of this type is shown in FIG. 1. In this embodiment, there is shown a film package 10 having a longitudinal RF seal 12 on rear side 11. The bottom edge has an RF seal 13 and the top edge an RD seal 14. This film package has a spout 15 which has been formed into the package. Seal 16 seals the pouch in the area of the spout. This spout resembles a beak. This is a preferred packaging. These concepts can be incorporated into other packaging.

The foregoing sets out a preferred embodiment of the present invention. Modifications and variations can be made to suit particular purposes. However, such modifications and variations would constitute a practice of the present invention.

I claim:

1. A sheet of material for producing pouches for containing substances consisting of three adjacent film layers of an inner barrier layer and two exterior seal layers, the barrier layer being a polyolefin and the seal layers being ethylene vinyl acetate copolymer layers having an average vinyl acetate content of at least about 18 percent by weight, said adjacent film layers having a slip agent content of about 500 to 3,000 parts per million, at least a partial transmissivity to fragrances, a transmissivity to oxygen of at least about 600 cm$^3$/m$^2$/day/bar, the combined adjacent film layers being of an age since being made of about 2 to 24 weeks whereby said slip agent has not significantly migrated to exterior surfaces of said combined film layers and whereby said seal layers can be welded using radio frequency welding to produce pouches.

2. A sheet of material for producing pouches as in claim 1 wherein said polyolefin is polyethylene.

3. A sheet of material for producing pouches as in claim 1 wherein said barrier layer has a thickness of about 25 to 100 microns and said seal layers have a thickness of about 50 to 200 microns.

4. A sheet of material for producing pouches as in claim 1 wherein said plurality of film layers being of an age of about 4 weeks to 20 weeks.

5. A pouch containing a substance comprising a sheet of material sealed to form a closed volume and consisting of three adjacent film layers of an inner barrier layer and two exterior seal layers, the barrier layers being a polyolefin and the seal layers being ethylene vinyl acetate copolymer layers having an average vinyl acetate content of at least about 18 percent by weight, said adjacent film layers having a slip agent content of about 500 to 3,000 parts per million, at least a partial transmissivity to fragrances, a transmissivity to oxygen of at least about 600 cm$^3$/m$^2$day/bar, the combined adjacent film layers being of an age since being made of about 2 to 24 weeks whereby said slip agent has not significantly migrated to exterior surfaces of said adjacent film layers and whereby said seal layers can be welded using radio frequency welding to produce pouches.

6. A pouch as in claim 5 wherein said polyolefin is polyethylene.

7. A pouch as in claim 5 wherein said barrier layer has a thickness of about 25 to 100 microns and said seal layer has a thickness of about 50 to 200 microns.

8. A pouch as in claim 5 wherein said sheet material being of an age of about 4 to 20 weeks.

9. A pouch as in claim 5 wherein said plurality of film layers are of an age depending on the slip agent content of the film.

10. A pouch as in claim 5 wherein the upper portion thereof has a spout.

* * * * *